(12) United States Patent
Neilan et al.

(10) Patent No.: US 11,950,604 B2
(45) Date of Patent: Apr. 9, 2024

(54) PLANT-BASED YOGURT

(71) Applicant: The Icelandic Milk & Skyr Corporation, New York, NY (US)

(72) Inventors: Charlotte Neilan, New York, NY (US); Mark Kavanagh, New York, NY (US)

(73) Assignee: The Icelandic Milk & Skyr Corporation, Ney York, NY (US)

(*) Notice: Subject to any disclaimer, the term of this patent is extended or adjusted under 35 U.S.C. 154(b) by 339 days.

(21) Appl. No.: 16/881,618

(22) Filed: May 22, 2020

(65) Prior Publication Data

US 2020/0367522 A1 Nov. 26, 2020

Related U.S. Application Data

(60) Provisional application No. 62/852,708, filed on May 24, 2019.

(51) Int. Cl.
| | |
|---|---|
| *A23C 11/10* | (2021.01) |
| *A23L 29/10* | (2016.01) |
| *A23L 33/135* | (2016.01) |
| *A23L 33/185* | (2016.01) |
| *A23L 25/00* | (2016.01) |

(52) U.S. Cl.
CPC ............ *A23C 11/106* (2013.01); *A23L 29/10* (2016.08); *A23L 33/135* (2016.08); *A23L 33/185* (2016.08); *A23L 25/40* (2016.08)

(58) Field of Classification Search
CPC ...... A23C 11/106; A23L 29/10; A23L 33/135; A23L 33/185; A23L 25/40
USPC .......................................................... 426/43
See application file for complete search history.

(56) References Cited

U.S. PATENT DOCUMENTS

| | | | | |
|---|---|---|---|---|
| 6,399,124 | B1* | 6/2002 | Lesens | A21D 13/33 426/61 |
| 10,143,226 | B1* | 12/2018 | Foster | A23L 33/40 |
| 2007/0020373 | A1 | 1/2007 | Maury | |
| 2013/0115329 | A1 | 5/2013 | Savant et al. | |
| 2013/0115330 | A1* | 5/2013 | Savant | A23L 29/30 426/106 |
| 2019/0045826 | A1 | 2/2019 | Barata et al. | |

FOREIGN PATENT DOCUMENTS

| | | | |
|---|---|---|---|
| CN | 103238884 B | 8/2014 | |
| CN | 104522810 A | 4/2015 | |
| CN | 106387806 A | 2/2017 | |
| EP | 2943077 B1 | 10/2018 | |
| WO | 2014110540 A1 | 7/2014 | |
| WO | 2017001265 A1 | 1/2017 | |
| WO | WO-2017001265 A1 * | 1/2017 | ............... A23G 9/42 |

OTHER PUBLICATIONS

Pehowich et al., Fatty acid composition and possible health effects of coconut constituents, The West Indian Med J, 49(2):128-33, Jul. 2000. (Year: 2000).*
Peters, Chobani has a new line of vegan yogurt, made from coconut, Fast Company, Jan. 9, 2019. (Year: 2019).*

* cited by examiner

*Primary Examiner* — Brent T O'Hern
(74) *Attorney, Agent, or Firm* — Stinson LLP

(57) ABSTRACT

Plant-based yogurt products having a high protein content without the unpleasant taste associated with a high protein contact from the plant-based protein source are disclosed herein. Particularly disclosed are plant-based yogurt products including macadamia nut butter to mask the unpleasant taste of pea protein powder used in the yogurt products to provide high protein content.

16 Claims, No Drawings

PLANT-BASED YOGURT

CROSS REFERENCE TO RELATED APPLICATIONS

This application claims priority to U.S. Provisional Patent Application No. 62/852,708 filed May 24, 2019, the disclosure of which is hereby expressly incorporated by reference in its entirety.

BACKGROUND OF THE DISCLOSURE

The present disclosure is generally directed to non-dairy food products. In particular, the present disclosure is directed to plant-based yogurt products having a vegetable protein and macadamia nut butter.

A large portion of the population is not able to consume dairy-based products since they cannot metabolize lactose, a sugar found in dairy products. Alternatives for dairy-like products are desirable because of intolerances to dairy products. Vegetarian and vegan diets are increasing in popularity and provide many benefits to individual consumers and world food requirements. These diets provide healthy nutrition (e.g., lower saturated fats, no cholesterol), absence of ethical or religious dietary conflicts, less negative environmental impacts (e.g., less greenhouse gases produced in production), and more efficient use of resources (e.g., less water used in production). Non-dairy products provide an alternative to those with intolerances and those seeking to avoid animal-based food products.

Non-dairy products suffer from lower equivalent protein and fat contents than dairy, and thus, can be of lower nutritional value. Further, ingredients used in non-dairy products can contain compounds that produce unpleasant flavors and colors, can affect the appearance, sensory and nutritional qualities, and can affect the stability and shelf life of non-dairy products.

Accordingly, there exists a need for non-dairy products having the nutritional content, flavor and appearance of dairy products. The present disclosure provides plant-based yogurt products having the nutritional content, flavor and appearance of dairy yogurt. It has been advantageously found that the plant-based yogurt products of the present disclosure can have a high protein content without the unpleasant taste associated with a high protein content from the plant-based protein source.

BRIEF DESCRIPTION OF THE DISCLOSURE

The present disclosure is generally related to plant-based yogurt products having a high protein content without the unpleasant taste associated with high protein from the plant-based protein source. More particularly, it has been found that nut butters, and in particular, macadamia nut butter, can be added to a yogurt composition to mask the unpleasant taste associated with plant-based vegetable proteins.

In one aspect, the present disclosure is directed to a plant-based yogurt comprising macadamia nut butter, a vegetable protein source, and an oil, wherein the yogurt is dairy-free.

In another aspect, the present disclosure is directed to a plant-based yogurt comprising from about 1.0% by weight to about 5.0% by weight macadamia nut butter, a vegetable protein source, and an oil.

In yet another aspect, the present disclosure is directed to a plant-based yogurt comprising macadamia nut butter, a pea protein, coconut oil, and coconut cream.

DETAILED DESCRIPTION

Unless defined otherwise, all technical and scientific terms used herein have the same meaning as commonly understood by one of ordinary skill in the art to which the disclosure belongs. Although any methods and materials similar to or equivalent to those described herein can be used in the practice or testing of the present disclosure, the preferred methods and materials are described below.

The present disclosure is generally directed to a plant-based yogurt including macadamia nut butter, a vegetable protein source, and an oil, wherein the yogurt is dairy-free. It has been found that a plant-based yogurt can be prepared to be dairy-free and still provide high protein to the consumer. Further, by including macadamia nut butter into the yogurt composition, the undesirable taste, particularly, the earthy taste typical of vegetable protein sources, can be masked such that the yogurt has an appealing taste similar to dairy yogurts.

To achieve a dairy-free plant-based yogurt having a high protein content with a desirable flavor, the plant-based yogurt suitably has macadamia nut butter in an amount of from about 1.0% by weight to about 5.0% by weight, including from about 1.25% by weight to about 3.0% by weight; including from about 1.50% by weight to about 2.75% by weight; and including about 2.0% by weight to about 2.5% by weight yogurt.

To provide high protein content, one or more vegetable protein sources are provided. Suitable vegetable protein sources include soy protein, pea protein, potato protein and combinations thereof. One particular vegetable protein source is a medium hydrolyzed non-GMO 80% pea protein, such as is commercially available at PURIS Pea 870 MV (Puris, Minneapolis, MN).

It should be understood that the vegetable protein sources include isolates, concentrations and combinations thereof to provide the desired amount of protein to the consumer. Typically, the vegetable protein sources are in the yogurt in amounts and forms such to provide about 10 grams of protein per 5.3 oz yogurt serving. In some embodiments, the vegetable protein sources are present in amounts and forms to provide greater than 10 grams of protein per 5.3 oz yogurt, including about 12 grams of protein per 5.3 oz yogurt, including about 13 grams of protein per 5.3 oz yogurt, including about 15 grams of protein per 5.3 oz yogurt, and including about 18 grams of protein per 5.3 oz yogurt.

In addition to providing a high protein content, the vegetable protein sources provide thicker texture to the final yogurt product.

Suitable amounts of vegetable protein sources include from about 5.0% by weight to about 10.0% by weight of the yogurt composition, including from about 6.0% by weight to about 9.0% by weight, including from about 7.0% by weight to about 8.5% by weight, and including about 8.0% by weight of the yogurt composition.

To provide a smooth creamy texture, the yogurt may further include oils, and in particular, olive oil, coconut oil, canola oil, and other vegetable oils. In one particularly suitable embodiment, the oil is coconut oil. In particularly suitable embodiments, the composition may include the oil in amounts of from about 1.0% by weight to about 5.0% by weight, including about 2.0% by weight to about 4% by weight, and including about 3% by weight of the yogurt composition.

In some embodiments, the yogurt composition can further include coconut cream to further provide a smooth creamy texture and improved mouthfeel in the final yogurt product.

In these embodiments, the composition may include the coconut cream in amounts of from about 5.0% by weight to about 15.0% by weight, including about 7.0% by weight to about 12% by weight, and including about 9% by weight to about 10.0% by weight of the yogurt composition.

In some embodiments, the yogurt compositions include live cultures and/or probiotics. Suitable yogurt live bacteria cultures include *Streptococcus* and *Lactobacillus*, such as *Streptococcus salivarius* subsp. *thermophilus, Streptococcus filant, Streptococcus lactis* var. *taette, Streptococcus lactis* subsp. *diacetylactis* and *Lactobacillus delbrueckii* subsp. *bulgaricus*. In one embodiment, the yogurt composition may contain the live cultures including *Streptococcus* thermophiles, *Lactobacillus delbrueckii* subsp. *Bulgaricus, Lactobacillus plantarum, Lactobacillus acidophilus* (NCFM®), and *Bifidobacterium lactis* (HN019™) and mixtures thereof. The yogurt may comprise other lactic acid bacteria for taste or health effects (probiotics) including, for example, *Lactobacillus* sp, such as *L. acidophilus* and *Lactobacillus casei*, and *Bifidobacterium* species. In one embodiment, the yogurt includes, for example, *Bifidobacterium lactis* (HN019™).

Yogurts of the present disclosure further contain sugar (i.e., sucrose, glucose and fructose), wherein the sugar content is less than 14% per weight. In some embodiments, the sugar content is less than 7.5% per weight. In some embodiments, the sugar content is less than 5.0% by weight. In some embodiments, the sugar content is less than 3.0% by weight. In some embodiments, the sugar content is less than 2% by weight. The sugar content may be at least 0.1% by weight but can be lower. Preferably, the sugar content ranges from about 0.5% by weight to about 14% by weight.

The yogurt may further include a sugar replacer and/or a sweetener. In some embodiments, the sugar can be replaced completely or partially by sugar replacers. Examples of suitable sweeteners are saccharin, aspartame, sucralose, neotame and acesulfame potassium, acesulfame, neotame, taumatine, cyclamate, and combinations thereof. Suitable sugar replacers include, for example, sorbitol, mannitol, isomaltitol, xylitol, isomalt, lactitol, hydrogenated starch hydrolysates (HSH, including maltitol syrups) and mixtures thereof. Suitable natural non-sugar sweetening agent(s) can be, for example, *Momordica* Grosvenorii (Mogrosides IV or V) extracts, Rooibos extracts, Neohesperidin dihydrochalcone, Honeybush extracts, *Stevia* extract, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, isomaltulose, and/or natural polyols such as maltitol, mannitol, lactitol, sorbitol, inositol, xylitol, threitol, galactitol and combinations thereof.

The yogurt composition can contain one or more additional additives selected from stabilizers, emulsifiers, flavoring agents, coloring agents, vitamins, minerals, acidity regulators, thickeners (e.g., tapioca flour, pectin, starch, gums, and the like and combinations thereof), preservatives, emulsifiers, antioxidants and mixtures thereof. Each of these materials may be a single component or a mixture of two or more components.

Suitable vitamins and minerals include calcium, iron, zinc, copper, phosphorous, biotin, folic acid, pantothenic acid, iodine, vitamin A, vitamin C, vitamin B1, vitamin B2, vitamin B3, vitamin B6, vitamin B9, vitamin B12, vitamin D, vitamin E, vitamin K and combinations thereof.

Suitable acidity regulators include organic as well as inorganic edible acids. The acids can be added or be present in their undissociated form or, alternatively, as their respective salts, for example, potassium or sodium hydrogen phosphate, potassium or sodium dihydrogen phosphate salts. Suitable acids are edible organic acids which include citric acid, malic acid, fumaric acid, adipic acid, phosphoric acid, gluconic acid, tartaric acid, ascorbic acid, acetic acid, phosphoric acid, and combinations thereof.

The yogurt compositions can include natural fruit flavoring and/or artificial fruit flavoring agents. Suitable fruit flavorings can be, for example, strawberry, blueberry, blackberry, cherry, cranberry, raspberry, gooseberry, elderberry, blackcurrant orange, lemon, lime, pineapple, apple, pear, peach, plum, apricot, nectarine, grape, cherry, currant, mandarin, mango, guava, rhubarb, pomegranate, kiwi, papaya, watermelon, passion fruit, tangerine, cantaloupe and grapefruit. Yogurts may include a flavoring agents. Flavoring agents may be used singly or in combination with natural and artificial fruit flavoring agents. Suitable flavors include, for example, vanilla, chocolate, mint and combinations thereof.

Suitable coloring agents including natural and artificial colors may optionally be used. Suitable coloring agents include colors present in vegetable juices, riboflavin, carotenoids (e.g. n-carotene), tumeric, and lycopenes.

Suitable preservatives include sorbate preservatives, benzoate preservatives, and combinations thereof.

Suitable antioxidants include, for example, natural or synthetic tocopherols, TBHQ, BHT, BHA, free radical scavengers, propylgallate, ascorbylesters of fatty acids and enzymes with anti-oxidant properties.

Exemplary Formulations

The below compositions are for exemplary purposes only. It should be understood that the yogurt can include varying additional/alternative ingredients and amounts as described in the above description.

| Exemplary Composition 1: Plain yogurt | | |
|---|---|---|
| Ingredient | % by weight | Purpose |
| Water | 72.59 | Used to hydrate all dry ingredients |
| Coconut cream | 10.00 | Provides smooth creamy texture and fat for mouthfeel |
| Pea protein powder | 8.15 | Provides 10 g protein per 5.3 oz cup; Texture thickener |
| Sugar | 1.00 | Enables fermentation by cultures |
| Coconut oil | 3.00 | Enables smooth texture |
| *Macadamia* nut butter | 2.51 | Used to mask earthy pea protein flavor |
| Pectin & Tapioca Flour | 2.75 | Stabilizer and emulsifier to prevent separation over shelf life |
| Culture | 0.0003 | Non-dairy cultures to ferment sugar in the yogurt and add flavor |
| Total | 100.00 | |

Exemplary Composition 2: Strawberry yogurt

| Ingredient | % by weight | Purpose |
|---|---|---|
| Water | 65.33 | Used to hydrate all dry ingredients |
| Coconut cream | 9.00 | Provides smooth creamy texture and fat for mouthfeel |
| Pea protein powder | 7.34 | Provides 10 g protein per 5.3 oz cup; Texture thickener |
| Sugar | 0.90 | Enables fermentation by cultures |
| Coconut oil | 2.70 | Enables smooth texture |
| *Macadamia* nut butter | 2.26 | Used to mask earthy pea protein flavor |
| Pectin & Tapioca Flour | 2.48 | Stabilizer and emulsifier to prevent separation over shelf life |
| Culture | 0.0003 | Non-dairy cultures to ferment sugar in the yogurt and add flavor |
| Fruit prep - strawberry puree | 3.00 | Standard fruit preparation blend for flavor |
| Fruit prep - natural flavor | 1.00 | Standard fruit preparation blend for flavor |
| Fruit prep - Sugar | 5.00 | Standard fruit preparation blend for flavor |
| Fruit prep - Pectin | 1.00 | Standard fruit preparation blend for flavor |
| Total | 100.00 | |

Exemplary Composition 3: Plain yogurt

| Ingredient | % by weight | Purpose |
|---|---|---|
| Water | 73.34 | Used to hydrate all dry ingredients |
| Coconut cream | 10.00 | Provides smooth creamy texture and fat for mouthfeel |
| Pea protein powder | 8.15 | Provides 10 g protein per 5.3 oz cup; Texture thickener |
| Sweetener | 1.00 | Enables fermentation by cultures |
| Coconut oil | 3.00 | Enables smooth texture |
| *Macadamia* nut butter | 2.51 | Used to mask earthy pea protein flavor |
| Pectin & Tapioca Flour | 2.00 | Stabilizer and emulsifier to prevent separation over shelf life |
| Vege 022 200 DCU | 0-0.01 | Enables fermentation of sucrose in sweetener and adds fermented flavor |
| Holbac Vege FRO 500 DCU | 0-0.01 | Enables fermentation of sucrose in sweetener and adds fermented flavor |
| Total | 100.00 | |

What is claimed is:

1. A plant-based yogurt being formed by combining at least a first ingredient being macadamia nut butter, from about 5.0% to about 10.0% by weight of a second ingredient selected from the group consisting of soy protein, pea protein, potato protein, and combinations thereof, and a third ingredient selected from the group consisting of olive oil, coconut oil, and canola oil, wherein the yogurt is dairy-free.

2. The plant-based yogurt as set forth in claim 1 being formed by combining from about 2.0% by weight to about 3.0% by weight of the macadamia nut butter with the second ingredient and the third ingredient.

3. The plant-based yogurt as set forth in claim 1, wherein the second ingredient is the pea protein.

4. The plant-based yogurt as set forth in claim 1, wherein the third ingredient is the coconut oil.

5. The plant-based yogurt as set forth in claim 1 being formed by further combining a fourth ingredient, wherein the fourth ingredient is coconut cream.

6. The plant-based yogurt as set forth in claim 1 being formed by further combining one or more of a stabilizer, emulsifier, flavoring agent, live bacterial culture, and probiotic.

7. A plant-based yogurt being formed by combining at least from about 1.0% by weight to about 5.0% by weight of a first ingredient being macadamia nut butter, from about 5.0% by weight to about 10.0% by weight of a second ingredient selected from the group consisting of soy protein, pea protein, potato protein, and combinations thereof, and a third ingredient selected from the group consisting of olive oil, coconut oil, and canola oil.

8. The plant-based yogurt as set forth in claim 7 being formed by combining from about 7.0% by weight to about 8.5% by weight of the second ingredient with the first ingredient and the third ingredient.

9. The plant-based yogurt as set forth in claim 7 being formed by combining 2.0% by weight to about 4.0% by weight of the third ingredient with the first ingredient and the second ingredient.

10. The plant-based yogurt as set forth in claim 9 wherein the third ingredient is the coconut oil.

11. The plant-based yogurt as set forth in claim 7 being formed by further combining a fourth ingredient, wherein the fourth ingredient is coconut cream.

12. The plant-based yogurt as set forth in claim 7 being formed by further combining one or more of a stabilizer, emulsifier, flavoring agent, live bacterial culture, and probiotic.

13. A plant-based yogurt being formed by combining a first ingredient, a second ingredient, a third ingredient and a fourth ingredient, wherein the first ingredient is macadamia nut butter, the second ingredient is a pea protein, the third ingredient is coconut oil, and the fourth ingredient is coconut cream.

14. The plant-based yogurt as set forth in claim 13 being formed by combining from about 1.0% to about 5.0% by weight of the macadamia nut butter, from about 5.0% to about 10.0% by weight of the pea protein, from about 1.0% to about 5.0% by weight of the coconut oil and from about 5.0% to about 15.0% by weight of the coconut cream.

15. The plant-based yogurt as set forth in claim 13 being formed by further combining a live bacterial culture and/or probiotic.

16. The plant-based yogurt as set forth in claim 13 being formed by further combining one or more of a stabilizer, emulsifier, and flavoring agent.

* * * * *